No. 642,792. Patented Feb. 6, 1900.
J. T. HAY.
THRESHING CYLINDER.
(Application filed July 14, 1899.)
(No Model.) 3 Sheets—Sheet 1.

Witnesses,
Chas. A. Failles
L. A. Minturn

Inventor
John T. Hay,
By Joseph A. Minturn
Attorney,

No. 642,792. Patented Feb. 6, 1900.
J. T. HAY.
THRESHING CYLINDER.
(Application filed July 14, 1899.)
(No Model.) 3 Sheets—Sheet 2.

Witnesses,
Chas. C. Failles.
C. A. Minturn

Inventor,
John T. Hay
By Joseph A. Minturn
Attorney.

No. 642,792. Patented Feb. 6, 1900.
J. T. HAY.
THRESHING CYLINDER.
(Application filed July 14, 1899.)
(No Model.) 3 Sheets—Sheet 3.
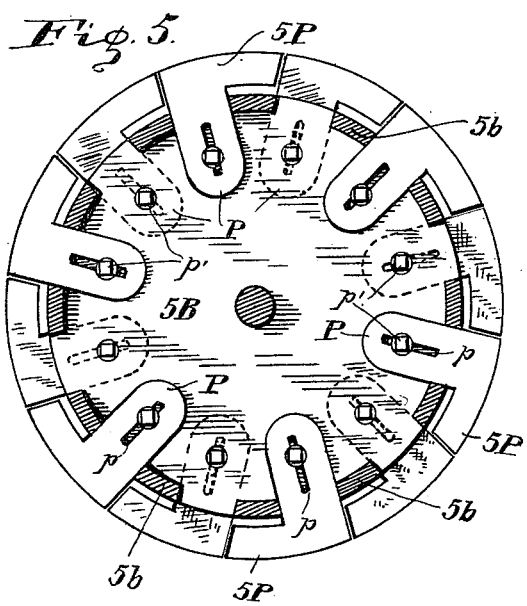
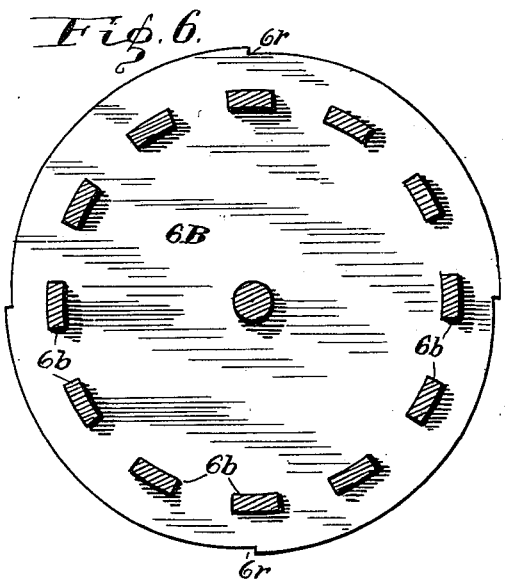
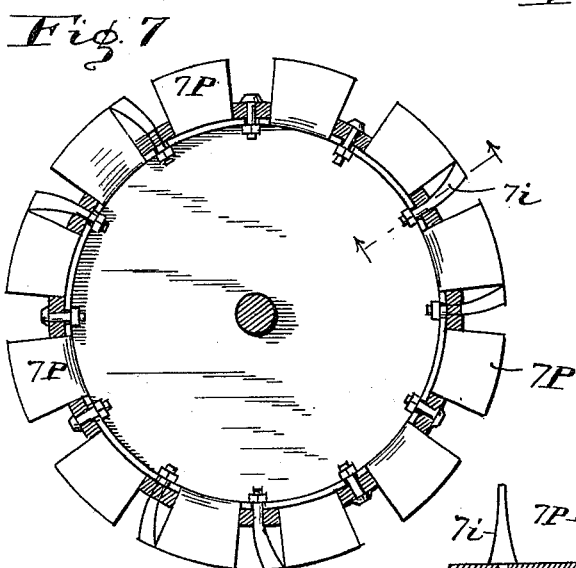
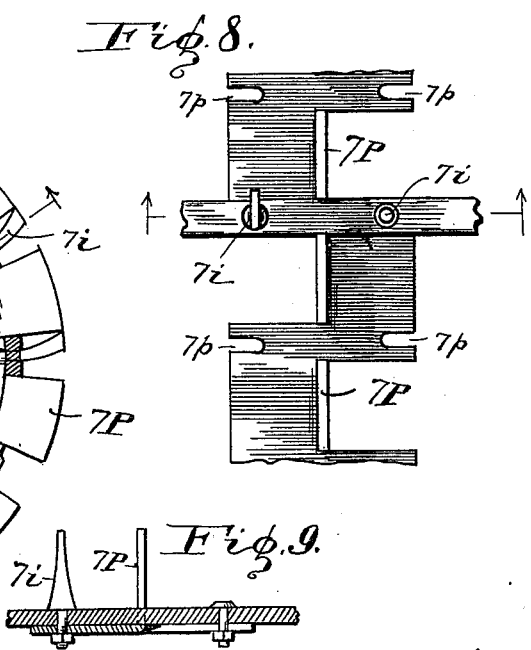
Witnesses,
Chas. C. Failles.
L. A. Minturn,
Inventor,
John T. Hay,
By Joseph A. Minturn
Attorney,

UNITED STATES PATENT OFFICE.

JOHN T. HAY, OF UNION CITY, OHIO.

THRESHING-CYLINDER.

SPECIFICATION forming part of Letters Patent No. 642,792, dated February 6, 1900.

Application filed July 14, 1899. Serial No. 723,833. (No model.)

*To all whom it may concern:*

Be it known that I, JOHN T. HAY, a citizen of the United States, residing at Union City, in the county of Darke and State of Ohio, have invented certain new and useful Improvements in Cylinders for Separators and Hullers, of which the following is a specification.

This invention relates to improvements in the cylinders of threshing-machines and clover-hullers and to the mechanism for feeding the bundles or sheaves to the cylinders and for cutting the bands by which the sheaves are held, the object being to dispense with the usual special mechanism of a band-cutter and feeder and apply a band-cutter to the cylinder itself to do the work of cutting the bands and of retarding the sheaves until the grain has been thoroughly threshed out of the heads.

It frequently happens in threshing that a sheaf going crosswise instead of end first passes to the cylinder through the band-cutter without the band being cut and by being dragged in by the teeth of the cylinder becomes wedged between the latter and the concave of the machine in a manner to clog and slow down the thresher and, perhaps, entirely stop it. This is injurious to the threshing-machine and to the engine and wastes time by delays; and it is one of the objects of this invention to provide a cylinder to successfully handle the sheaves whether the bands are cut or not, in fact, to cut the bands as the sheaves come to the cylinder either sidewise or endwise.

I accomplish the objects of the invention by the mechanism illustrated in the accompanying drawings, in which—

Figure 1:
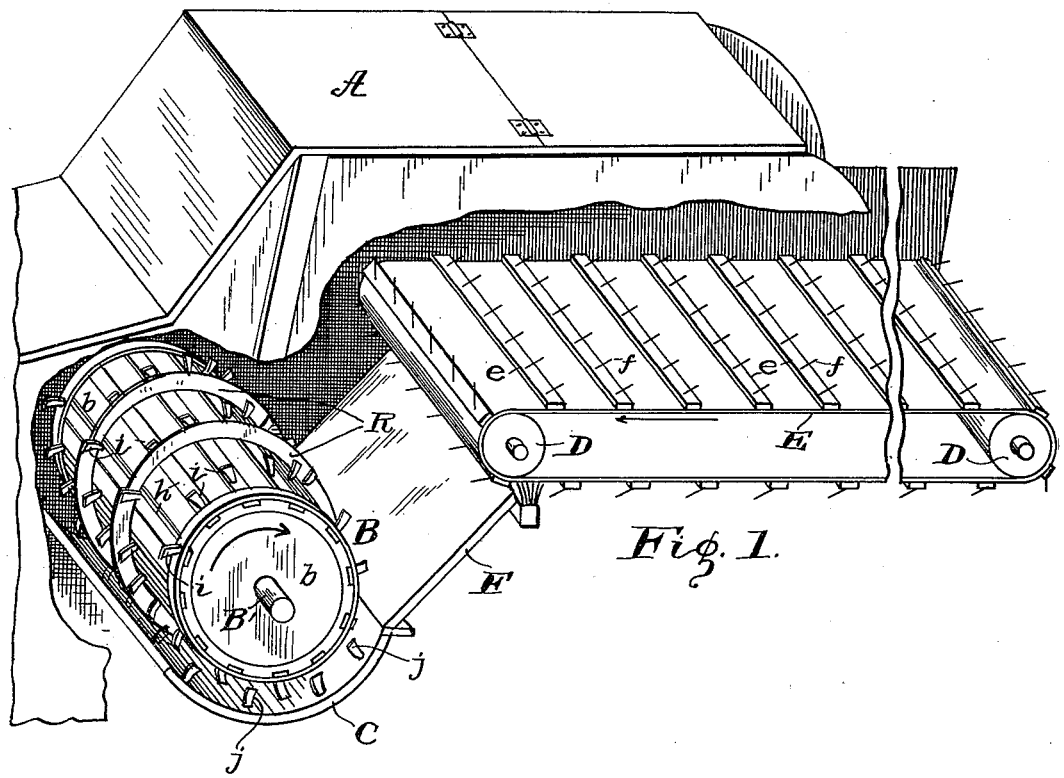
Figure 2:
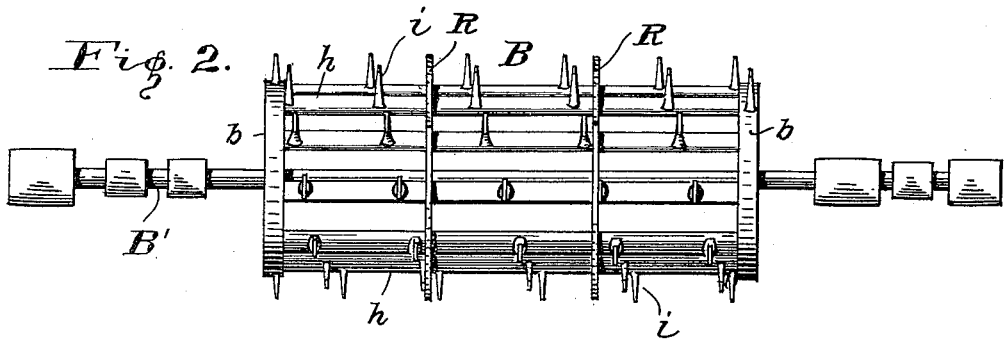
Figures 3, 4:
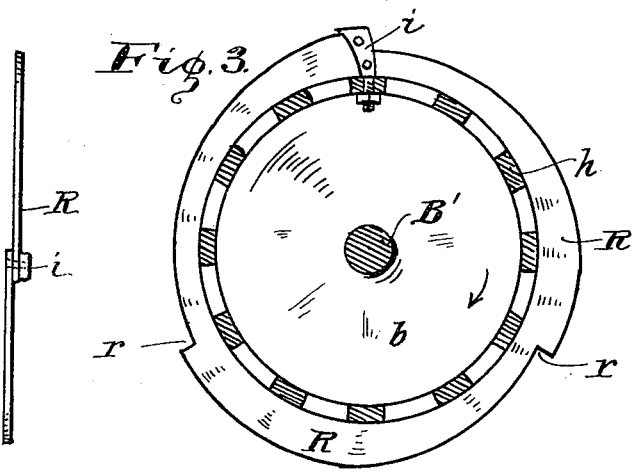
Figure 10:
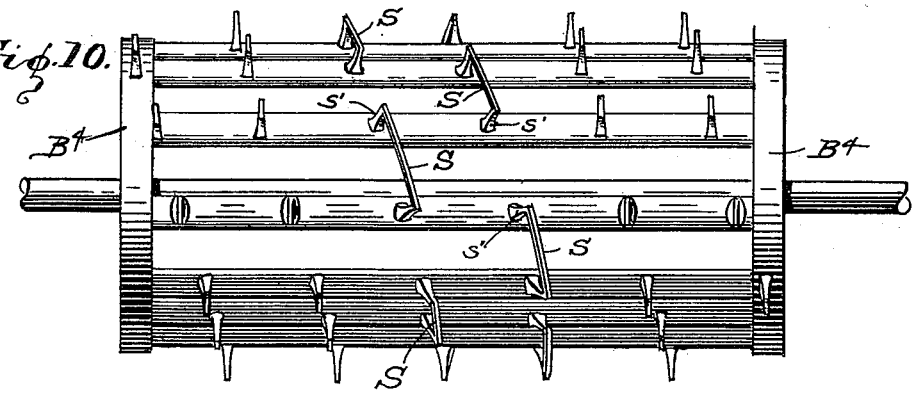

Figure 1 is a perspective view of a portion of a thresher-body having its near side broken away to expose the cylinder and carrier which embody my improvement; Fig. 2, a side view of my cylinder as it appears detached from the thresher-body; Fig. 3, a section of same on the line 3 3 of Fig. 2; Fig. 4, an edge view of a modified form of cylinder-ring detached from its associated parts; Fig. 5, a transverse section of a thresher-cylinder, showing a modified guard-ring made in sections, which are adjustable radially of the cylinder to change the diameter of the ring; Fig. 6, a transverse section of a cylinder, showing another modification in which the inner heads of the cylinder are increased in diameter to extend beyond the cylinder-bars and form the guard-ring; Fig. 7, a view in transverse section of a cylinder in which a band bolted against the inner sides of the bars has rightangled portions to project between the slats to form the guards; Fig. 8, a detail in side elevation of the band shown in Fig. 7; Fig. 9, a detail in section on the dotted line 9 9 of Figs. 7 and 8 looking in the directions of the arrows; Fig. 10, a side view of a modified form of threshing-cylinder, in which the function of the cylinder-ring is performed by bars connecting some of the teeth in pairs; and Fig. 11 a modification in which teeth wide at their ends form substitutes for the rings.

Like letters and figures of reference indicate like parts throughout the several views of the drawings.

A represents the body of a threshing-machine of any suitable and well-known construction.

B is the cylinder, which will be described in detail hereinafter. It is revolved in the direction of the arrow by suitable and usual mechanism (not shown) and stands above the concave C the usual distance.

D are a pair of rollers around which the canvas carrier E is placed. The rollers are driven by suitable well-known mechanism (not shown) in a direction to move the belt as indicated by the arrow. The material to be threshed is deposited on this carrier and is conveyed into the machine and deposited onto the chute-board F, leading to the cylinder. In order to make the action of the carrier more positive, it will be provided with the transverse strips or cleats *e*, and these, if desired, may have the fingers *f*, which project up and slope in the opposite direction to which the carrier is traveling in order to free themselves from the straw on their return.

The cylinder B has the circular heads *b*, mounted on the shaft B', and to the heads the longitudinal bars *h* are secured. These bars carry the teeth *i*, placed in a manner to pass between corresponding teeth *j* of the concave C. The teeth *j* hold the straw while the rapidly-moving teeth *i* beat the grains out of the heads.

The construction of cylinder and concave as thus far described is the same as that in common use in other threshers. My novel feature consists in providing the cylinder with one or more annular flanges or rings R, which present an outside narrow edge and extend out approximately the same distance as the teeth. The number of rings will depend on the length of the cylinder and the character, as to length, of the material to be threshed. The purpose of the rings is to keep straw coming to the cylinder sidewise from wedging down between the teeth of the cylinder and from being thus carried through without threshing out the grain. The rings force the straw down into the teeth of the concave, where it will be held by the latter long enough to permit the teeth of the cylinder to knock all of the grain out of the heads. To keep the straw from chugging under the cylinder and stopping the machine, I notch the outer edges of the rings, which gives to them a saw-like action, whereby the mass is sawed into shorter lengths, and the short straws are then carried through without any trouble and the packed condition relieved. The notches or serrations are shown at $r$. When the sheaves approach the cylinder endwise, the bands are cut by the rings R, making it unnecessary for any preliminary band-cutting to be done. The ring may extend out to the ends of the cylinder-teeth or to a longer or shorter distance, as the circumstances of material or the fancy of the thresherman may dictate, without departing from the spirit of this invention, and the number and depths of the serrations may vary without departing from the spirit of this invention.

Where the rings are put on at the factory, it will doubtless be found most convenient to heat and shrink them into place on the cylinder; but they are applicable to and will be found to be invaluable on machines already in use, and in applying to such machines it will be more convenient to make the rings in sections, the ends of which will be lapped and riveted or bolted together. In applying the rings they will occupy spaces where teeth formerly were in order when the cylinder is rotated to pass the teeth of the concave without striking them and in adapting the rings to an old cylinder it will be advantageous to bolt or rivet the band against the side of the teeth instead of removing the latter in order to more securely attach the rings and in order that the tooth by the side of the ring will continue to exercise its function of threshing the heads. This pieced construction is shown in Fig. 4.

In the modification shown in Fig. 5, $5^B$ represents the inner head of the cylinder, and $5^b$ the bars. P are plates which have the longitudinal slots $p$ and are bolted to the head by the bolts $p'$. The plates project between the bars $5^b$, which hold them against edgewise movement, and terminate outside of the bars with the segments $5^r$. The segments extend over the bars and together form a guard-ring around the cylinder. The longitudinal slots permit of an adjustment of the plates, whereby the diameter of the guard-ring can be made larger or smaller. In practice I prefer to alternate the plates in regard to the side of the head to which they are bolted, as shown in the drawings, Fig. 5.

In the modification shown in Fig. 6 the inner head $6^B$ itself is increased in diameter past the bars $6^b$ and forms in itself the guard-ring, the periphery of which is serrated, as shown at $6^r$.

In the modification shown in Figs. 7, 8, and 9 a bar of thin and comparatively wide metal is bolted to the cylinder-bars, preferably upon their inner sides, the bar having marginal slots or notches $7^p$ to receive the bolt end of the fingers $7^1$. The band is cut half across its width to form tongues $7^P$, which are bent out between each pair of bars to form a guard, as shown in the drawings. The band instead of being on the inside of the bars can be placed on the outside and bolted to the latter.

In the modification shown in Fig. 10 the tooth on one bar is connected by a bar with the top of the next following tooth. S are the bars connecting the tooth ends, and these bars will be numerous enough to make a closure, practically speaking, around the cylinder. $B^4$ is the cylinder, and $s'$ the teeth.

Figure 11:
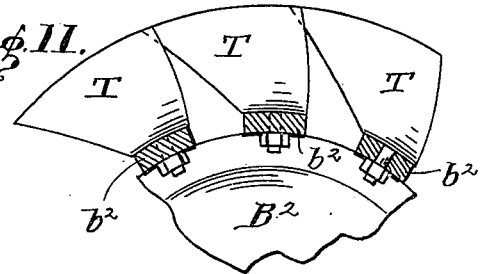

In the modification shown in Fig. 11, $B^2$ is the cylinder-head, $b^2$ the bars, and T the teeth, the outer ends of which are widened to such an extent as to lap the tooth behind it, the ends thereby forming obstructions or practical closures to keep the straw from working down between the teeth.

The rings or guards, as above described, retard the progress of the straw through the thresher and can be used with a self-feeding or a hand-feeding machine with advantage.

Having thus fully described my invention, what I claim as new, and wish to secure by Letters Patent of the United States, is—

1. In a separator or the like, a cylinder having teeth to dislodge the grain by impact against the ears containing same and having a guard or guards with striking edges to saw the straw extending around the cylinder to keep the straw from packing between the teeth, substantially as described.

2. In a separator or the like, a toothed cylinder having one or more annular flanges with serrated edges extending out approximately to the ends of the teeth and intermediate the ends of the cylinder.

In witness whereof I have hereunto set my hand and seal, at Indianapolis, Indiana, this 29th day of June, A D. 1899.

JOHN T. HAY. [L. S.]

Witnesses:
JOSEPH A. MINTURN,
CHAS. A. FAILLES.